UNITED STATES PATENT OFFICE.

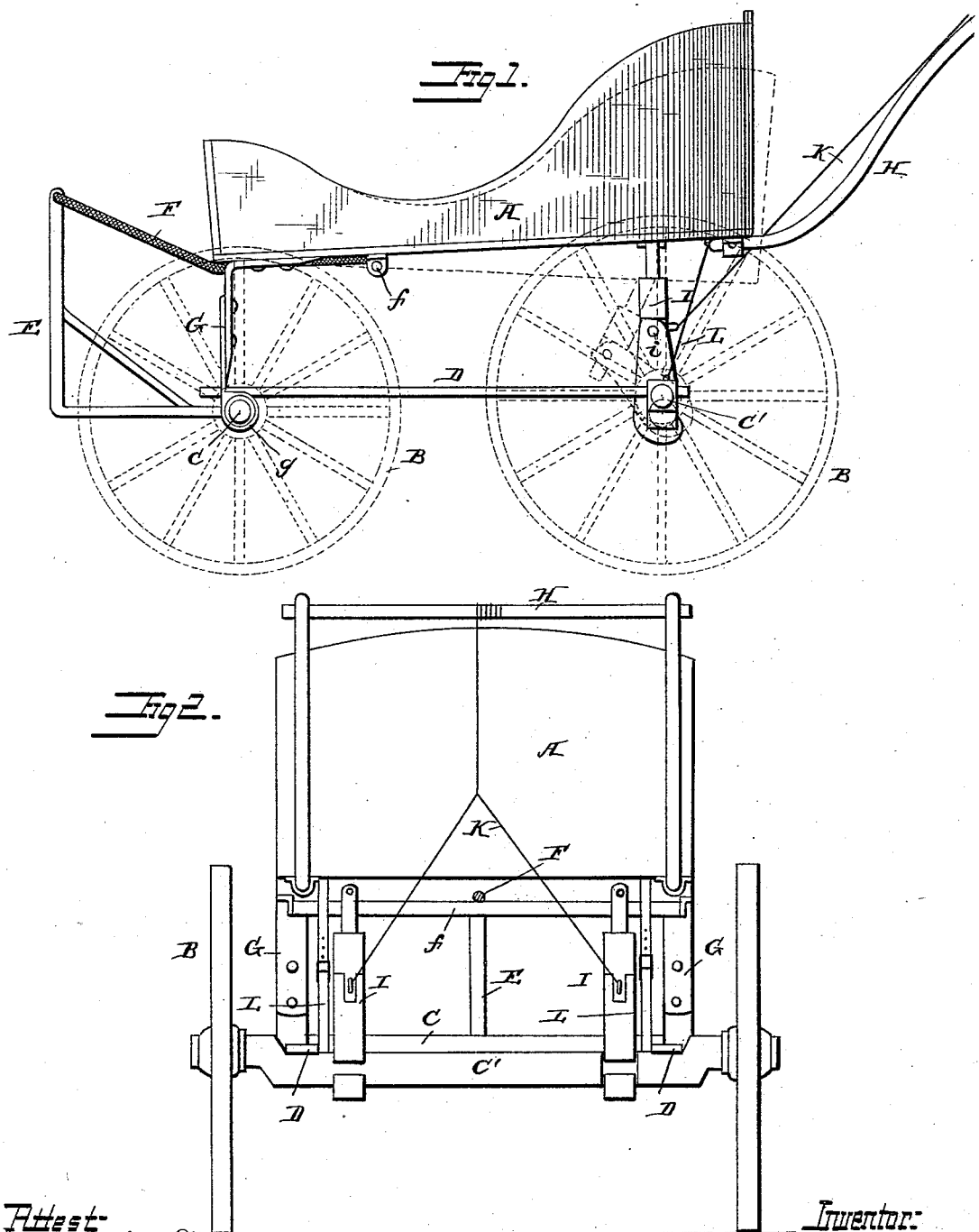

N. BAYARD CLINCH, OF GREEN COVE SPRINGS, FLORIDA.

CHILD'S CARRIAGE.

SPECIFICATION forming part of Letters Patent No. 379,207, dated March 13, 1888.

Application filed August 13, 1887. Serial No. 246,892. (No model.)

*To all whom it may concern:*

Be it known that I, N. BAYARD CLINCH, a citizen of the United States, and a resident of Green Cove Springs, in the county of Clay and State of Florida, have invented certain new and useful Improvements in Children's Carriages, of which the following is a specification.

Figure 1 is a side view of a child's carriage having my invention applied thereto, two of the wheels being removed to better show the parts. Fig. 2 is a rear view of the same.

In the drawings, A represents the body, which may be of any usual or preferred construction. B represents the wheels, and C C' the front and rear axles, respectively, they being rigidly united by reaches or connecting-bars D.

A frame or upward-projecting standard, E, extends forward from the front axle in front of the carriage-body, to which it is connected by an elastic cord or spring connection, F, which is united to any convenient part of the body, as a cross-bar, *f*, under the same. The forward end of the body is supported upon arms or standards G G, bolted or otherwise secured to the body, and provided at their lower ends with bearings *g*, which encircle journals on the front axle, thus permitting the body to swing freely upon the front axle, the spring F holding the body in proper position, so that it may have an easy swinging or rocking motion. The carriage is provided with a propelling-handle, H, projecting rearward from the body.

The body may be held from being thrown too far forward and upward by the spring by any desired connection between it and the rear axle, as by the strap or straps L, connecting the axle with the propelling-handle.

I I are bars or rods jointed at *i i* near the middle, and each connected at the lower end loosely with the rear axle and at the upper end with the carriage-body. The joints *i* and the loose connection of the bars with the axle permit them to double forward, (but not backward,) thus leaving the body free to vibrate on the front axle.

Connected with each rod near its joint is a cord or small chain, K, extending rearward to the handle H or to other point within convenient reach of the person having charge of the carriage. It will be seen that if these cords K are pulled the rods I will be drawn backward and straightened, thus forming a rigid connection—between the body and rear axle—against downward as well as upward movement. This permits the person propelling the carriage by pushing down on the handle to raise the front wheels from the ground, so that the carriage may be easily turned.

In ordinary use the jointed rods will be doubled forward, so as to leave the body free to swing and be acted upon by the spring D. These rods may be made to assist in supporting the body when it is so heavily loaded as that the spring would otherwise be strained, or be so far flexed as to give the carriage-body an uncomfortable backward inclination.

The spring D may have connected therewith any desired device for increasing or decreasing its tension.

It will be of course understood that the jointed bars or rods I may fold backward instead of forward without departing from my invention; but in a carriage arranged to be propelled as is that shown in the drawings the construction shown is preferable.

I do not in this application claim the combination, with the running-gear of a vehicle and a body supported thereon to have a rocking motion, of a standard in front of the body carried by the running-gear, and a spring-connection between such standard and the body, as such subject-matter is claimed in another application of mine prepared concurrently herewith.

Without limiting myself to the precise construction and arrangement of parts shown, I claim—

1. In a child's carriage, the combination, with the running-gear and body, of standards journaled to the front axle and supporting the body, a standard carried by the running-gear and extending upward in front of the body, and a spring-connection between said upright standard and the body, substantially as described.

2. In a child's carriage, the combination, with the front and rear axles, and connecting-bars uniting them and the body, of standards G G, to which the body is secured, provided at their lower ends with bearings *g*, which encircle the front axle and turn freely thereon, an upward-projecting standard in front of the body, and a spring-connection between the body and said standard, substantially as described.

3. In a child's carriage, the combination, with a running-gear and a body supported thereon at its forward end to have a free rocking or swinging motion, of inflexible connections adapted to be interposed between the body and running-gear to make the connection of the body therewith rigid against both upward and downward rocking movement, substantially as described.

4. In a child's carriage, the combination, with a running-gear and a body supported thereon at its forward end to have a free rocking or swinging motion, of jointed rods connecting the rear portion of the body with the running-gear, said rods when straightened serving to make a rigid connection between the body and running-gear, substantially as described.

5. In a child's carriage, the combination, with a running-gear and a body supported thereon at the front end to have a free rocking or swinging motion, of jointed rods I I, flexibly connected with the body and with the rear axle and adapted to swing forward, and cords K, connected with said rods and extending within convenient reach of the person propelling the carriage, whereby on drawing on the cords the rods may be straightened and the connection between the rear part of the body and the running-gear made rigid, substantially as described.

6. In a child's carriage, the combination, with a running-gear and the body supported to swing on the front axle, of a standard in front of the body, a spring-connection between the standard and body, and jointed rods between the rear portion of the body and the running-gear, adapted when straightened to make rigid the connection between the body and running-gear, substantially as described.

In testimony whereof I have signed my name to this specification in the presence of two subscribing witnesses.

N. BAYARD CLINCH.

Witnesses:
J. F. GREER,
H. E. BEMIS.